United States Patent [19]

Macken

[11] Patent Number: 5,205,967
[45] Date of Patent: Apr. 27, 1993

[54] METHOD OF FORMING RETARDATION PLATE UTILIZING DEFORMED ZINC SELENIDE

[76] Inventor: John Macken, 3755 Wallace Rd., Santa Rosa, Calif. 95404

[21] Appl. No.: 857,977

[22] Filed: Mar. 26, 1992

[51] Int. Cl.$^5$ .............................................. B29D 11/00
[52] U.S. Cl. ........................................ 264/1.2; 264/1.3; 264/2.7; 264/322
[58] Field of Search .................... 264/1.2, 1.3, 2.6, 2.7, 264/320, 322; 501/94; 252/584, 585, 587

[56] References Cited

U.S. PATENT DOCUMENTS

| 4,944,900 | 7/1990 | Willingham et al. | 264/1.2 |
| 5,126,081 | 6/1992 | Willingham et al. | 264/1.2 |

FOREIGN PATENT DOCUMENTS

| 688568 | 6/1964 | Canada | 264/1.2 |

Primary Examiner—Jan H. Silbaugh
Assistant Examiner—Christopher A. Fiorilla
Attorney, Agent, or Firm—Larry D. Johnson

[57] ABSTRACT

Zinc selenide is a transparent material which is commonly used with CO2 laser optics. This material can be converted to a birefringent form by deforming the zinc selenide at an elevated temperature. The birefringent zinc selenide can then be made into quarter wave plates.

10 Claims, 1 Drawing Sheet

METHOD OF FORMING RETARDATION PLATE UTILIZING DEFORMED ZINC SELENIDE

BACKGROUND OF THE INVENTION

1. Technical Field of the Invention

This invention relates to optics primarily used with lasers. More particularly, it relates to a process for making retardation plates such as quarter wave plates for use with molecular lasers such as CO2. This process utilizes deformed zinc selenide.

2. Description of the Prior Art

Industrial lasers such as CO2 lasers quite often require the use of circularly polarized light for cutting and welding of metals. There are various ways known to those skilled in the art to force the industrial lasers to lase linearly polarized. This linearly polarized light is then converted to circularly polarized light utilizing an external optical device. The most common device for doing this is referred to as a phase retardation reflector. This is a thin film total reflector which converts linearly polarized light to circularly polarized light when the proper reflecting angle conditions are met. The incident angle requirements usually results in the reflected laser beam propagating in an undesirable direction thereby requiring an additional reflector to straighten out the optical path. These two reflectors (and the associated mirror mounts) can be expensive and are a possible source of point instability problems.

Another way of converting linearly polarized light to circularly polarized light is to use a transmissive quarter wave plate. Before this current invention, the most common material used at 10.6 micron wavelength was cadmium sulfide. Cadmium sulfide is a crystalline material which exhibits a birefringence. Cadmium sulfide exhibits several problems which include high material cost, unavailability of large sizes, and high absorption compared to zinc selenide. Another undesirable feature is associated with the fact that cadmium sulfide exhibits a large birefringence which would require a theoretical thickness of 0.25 mm to achieve a quarter wavelength retardation of a CO2 laser beam. Because this is too thin to be practical, these retardation plates are made in an odd number of quarter wavelength multiples. Most commonly a retardation of 5 quarter wave or 7 quarter wave is used. This, in turn, creates other problems such as alignment, temperature and wavelength sensitivity.

By far, the most common transparent material used with high power CO2 lasers is zinc selenide. This is a very uniform material typically grown from chemical vapor deposition. As grown, it shows no obvious birefringence. It has been observed that there is a certain type of damage which can occur in zinc selenide where the transmissive optical element (output coupler or lens) becomes absorbing and stressed. The damaged optical component sometimes also exhibits a small radial birefringence (visible light) which is not uniform. This is considered an undesirable effect. Finally, in the prior art, it is known that some clear plastic materials can be made to be sufficiently birefringent to form quarter wave plates for visible light if the plastic is elongated in one direction. However, no organic material can transmit a powerful CO2 laser beam.

It would be very desirable if a quarter wave plate for use at 10.6 micron wavelength could be made out of zinc selenide. While zinc selenide has exhibited a small amount of birefringence which is apparent at visible wavelengths, this effect is uncontrolled and associated with damaged optics.

SUMMARY OF THE INVENTION

Even though zinc selenide is a cubic crystal, it has been found to exhibit plastic deformation at elevated temperatures. If a piece of zinc selenide is deformed in one direction while in this plastic state, the resultant material exhibits a birefringence. The orientation of the birefringence has one axis parallel to the direction of deformation. The amount of phase retardation which can be achieved relates to both the amount of deformation and the thickness of the zinc selenide. It is possible to deform zinc selenide in a controlled manner thereby producing a known birefringence. This, in turn, can result in a controlled amount of phase retardation when the deformed zinc selenide material is formed into an optical element. In the preferred embodiment, the amount of phase retardation would be ¼ wavelength at 10.6 microns (0.00026 cm difference in optical path length between the two orthogonal linear polarizations). The deformed zinc selenide can be used either as an output coupler material or as an external optical element. In either case, the direction of deformation is oriented at approximately a 45° angle to the direction of the linear polarization of the incident laser beam.

BRIEF DESCRIPTION OF DRAWINGS

In order to more fully understand the invention, a particular description of the invention by reference to specific embodiments depicted in the drawings, understand that these drawings are only typical embodiments and are therefore not to be considered limiting in scope. A brief description of the drawings is given as follows.

DESCRIPTION OF THE PREFERRED EMBODIMENTS

Figure 1A:
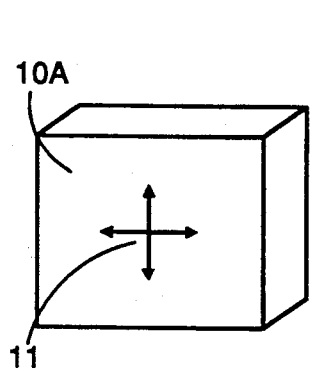
FIG. 1 is 3 perspective views of a piece of zinc selenide. These 3 views depict before, during, and after the deformation to generate birefringence.

Zinc selenide is the preferred material for use with high power industrial CO2 lasers. There are very few materials which transmit the 10.6 micron wavelength of the CO2 laser and of these, the most desirable material is zinc selenide. Typically, the zinc selenide is grown from chemical vapor deposition. This material is brittle at ambient temperature. When zinc selenide is grown by chemical vapor deposition, it exhibits a micro crystalline structure. However, it has been found that zinc selenide loses its brittle characteristic at elevated temperatures. There is very little indication of plastic deformation at a temperature less than 100° C. At a temperature of 500° C., it is observed that zinc selenide exhibits some plastic deformation. At a temperature of 800° C., the malleability of zinc selenide is quite apparent. It should be emphasized that zinc selenide also exhibits some chemical reactivity at elevated temperatures. If zinc selenide is heated in air above a temperature of about 200° C., there will be an oxidation of the surface which exhibits itself as a white haze on the surface. Also, at elevated temperatures, there is the possibility of liberating selenium which is poisonous. Therefore, in the preferred embodiment, any heating of zinc selenide should take place in a non-oxidizing environment. This could be merely a nitrogen cover gas, but because of possible selenium exposure, a closed chamber with an inert atmosphere or a vacuum is preferred.

When zinc selenide is deformed, the optical properties change so that there is no longer a single index of refraction in the material. Instead, light polarized in the direction of the deformation exhibits one index of refraction while light polarized in the orthogonal direction exhibits a different index of refraction. When materials have 2 or 3 indices of refraction, they are known as birefringent materials. The high index of refraction polarization direction is know as the "slow" axis and the low index of refraction direction is known as the "fast" axis. Heating zinc selenide to a temperature where plastic deformation can occur, results in both the ability to generate a birefringence and at the same time, the elevated temperature can result in an annealing process which gradually eliminates this birefringence. Therefore, those skilled in the art must choose a process cycle whereby zinc selenide would be heated to a specific temperature where it would then be subjected to a specific stress or strain for a specific period of time. The zinc selenide would then be cooled down to ambient temperature following a cooling cycle which is fast enough to retain some birefringence. Those skilled in the art can determine these conditions by experimentation. Even in a non-optimized condition, acceptable results can be obtained. For example, in a preliminary experiment, zinc selenide was heated to 230° C. for 24 hours. The zinc selenide was clamped in a spring-loaded device which exerted a constant pressure in one direction. After cooling and release of the clamping, it was observed that the zinc selenide exhibited a permanent birefringence. It is believed that an increased birefringence can be obtained at a higher temperature which would require an inert atmosphere or a vacuum. In another test, zinc selenide exhibited plastic deformation at a temperature of 800° C. and a pressure of 500,000 grams per square centimeter. The maximum temperature which zinc selenide can be subjected to is limited by the melting or sublimination of the material. As a point of reference, the zinc selenide is typically grown from chemical vapor deposition at a temperature of 750° C.

Figure 1B:
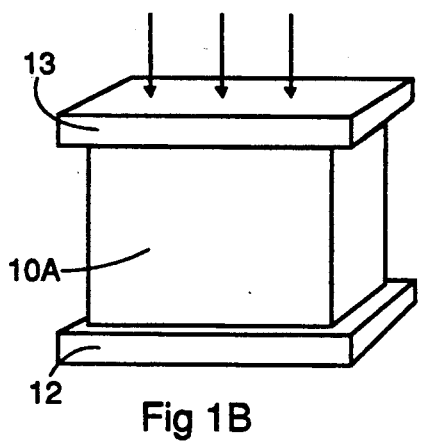

With this as a background it is now possible to describe the steps utilizing the figures. In FIG. 1A, there is shown a rectangle of zinc selenide designated 10A. This material is optically isotropic as indicated by the orthogonal arrows designated 11. These arrows are commonly used in optics to indicate the relative index of refraction for orthogonal polarizations. In FIG. 1A, the arrows of equal length indicating that light linearly polarized parallel to the vertical direction has the same index of refraction as light linearly polarized parallel to the horizontal direction. The zinc selenide is then placed in a condition similar to what is depicted in FIG. 1B. The two surfaces of the zinc selenide are clamped between plates 12 and 13. A force is then exerted perpendicular to these plates putting the zinc selenide 10A in compression in this particular example. It is to be understood that this force could be in the opposite direction thereby resulting in a tension. It is also to be understood that this is just a representation of a stress or strain in any direction on the material. The zinc selenide is also subjected to a temperature in excess of 100° C. The optimum temperature can be determined by experimentation. An estimate of the preferred temperature would be between 350° C. and 550° C. For a predetermined time, a predetermined stress or strain (force) is applied to the zinc selenide. Then the zinc selenide is cooled at a predetermined rate. It is optional whether to maintain the stress or strain during the cooling cycle.

Figure 1C:
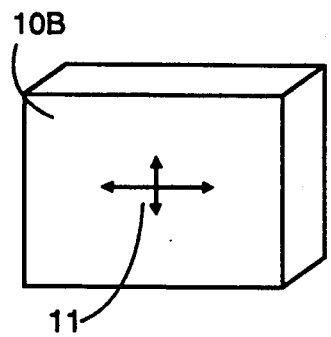

In FIG. 1C, the resultant zinc selenide is designated 10B. In this figure, the resultant dimensional change has been greatly exaggerated compared to the starting zinc selenide piece depicted in FIG. 1A. Also, the change in the index of refraction depicted by orthogonal arrows 11 has been greatly exaggerated. However, the point to be made here is that these zinc selenide after it has undergone this process does end up with two different indices of refraction which lie in planes parallel and perpendicular to the direction of the force. In this example, the zinc selenide can then be made into optical elements as will be described later. It should be understood that experimentation may show that it is possible in some cases to first form the optical part to the finished configuration then subsequently slightly deform the part as shown in FIGS. 1B and 1C. In that case, FIG. 1A could be considered close to the final shape including optically polished surfaces.

Figure 2:
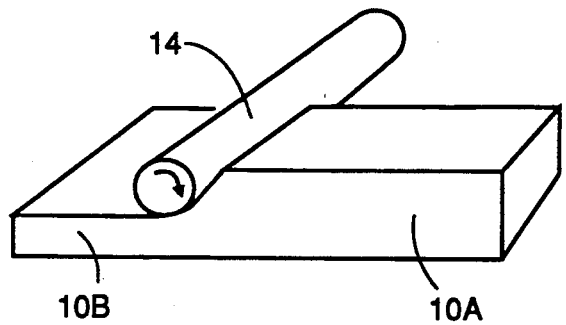
FIG. 2 is a perspective view which depicts an alternative method of deforming zinc selenide utilizing a roller.

FIG. 2 shows another method of deforming the zinc selenide thereby replacing FIG. 1B. In this case, it is presumed that the zinc selenide is at an elevated temperature and possibly in an inert atmosphere or vacuum depending upon the temperature chosen. The zinc selenide is supported by a lower surface not shown in FIG. 2. A roller designated 14 rolls over the surface of the zinc selenide causing a compression and elongation of the zinc selenide as it passes. The zinc selenide before passage of the roller is designated as 10A while the zinc selenide after the passage of the roller is designated 10B. After the roller has passed over the entire piece of material (perhaps multiple times) and the zinc selenide is cooled to ambient temperature, the resultant material will exhibit a birefringence similar to that discussed in FIG. 1C.

Besides the two methods shown here for deforming zinc selenide, other methods are known to those skilled in the art. For example, if the zinc selenide is found to be sufficiently plastic, it is possible to extrude the material. Other forms of deformation which are not considered as desirable include torsional forces and bending forces.

Figure 3:
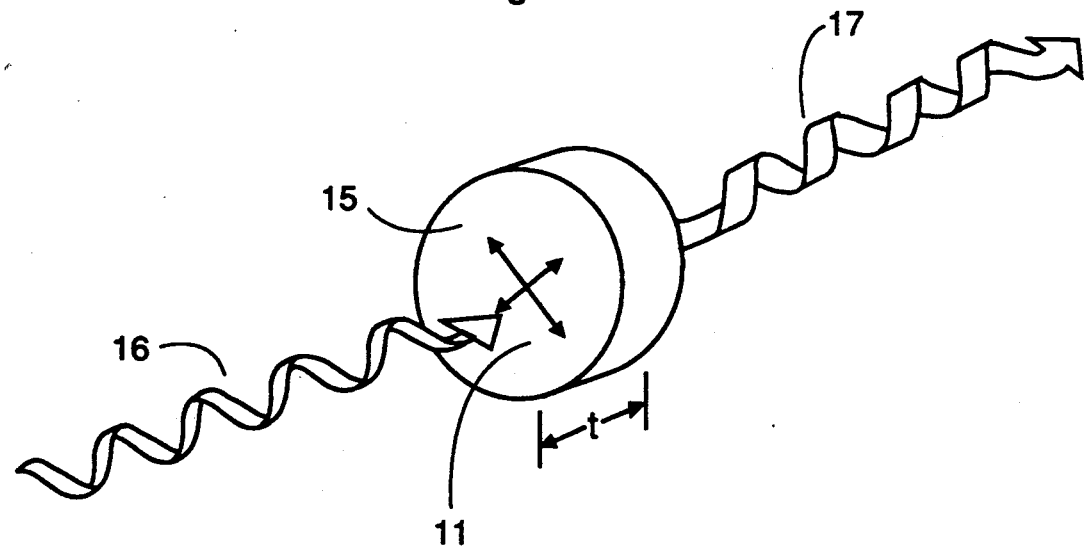
FIG. 3 is a perspective view of a piece of birefringent zinc selenide. This figure also depicts the conversion of linearly polarized light to circularly polarized light.

While it is possible to utilize completely polished optical pieces in the approach depicted in FIGS. 1A, 1B and 1C, the preferred embodiment is to polish the optical element after the deformation has taken place. FIG. 3 depicts a finished circular polarizer utilizing deformed zinc selenide (item 15). In this example, the orientation of the fast and slow optic axis is oriented on a 45° angle compared to that depicted in FIG. 1. Item 16 in FIG. 3 is linearly polarized laser light oriented with the plane of polarization vertical. This relative orientation of the plane of polarization and the fast and slow axis is well known to those skilled in the art. The thickness of optical element 15 is designated as "t". As previously stated, the deformation causes the zinc selenide to have two different indices of refraction. The importance here is the difference between these two numbers as given by the following equation:

$$\Delta m = N_s - N_f$$

where:

$N_s$ is the index of refraction for light polarized parallel to the "slow" optic axis (higher index of refraction)

$N_f$ is the index of refraction for light polarized parallel to the "fast" optic axis (lower index of refraction)

$\Delta m$ is the difference in the two indices, sometimes referred to as the birefringence factor.

The difference in optical path length (a) between light polarized parallel to the fast and light polarized parallel to the slow axis is given by the following equation:

$$a = (\Delta m)t$$

Since zinc selenide is primarily used with CO2 laser, the minimum useful retardation for a practical device would be a ⅛ wave path length difference (a=⅛l) at a wavelength of 10.6 microns (0.00106 cm), this would result in the following relationship:

$$0.00013 \; cm = (\Delta m)t$$

To make a quarter wave plate for circularly polarized light, the path length difference would be $(\Delta m)t = 0.00026$ cm. Other useful thicknesses such as a half wave plate are also possible $(\Delta m)t = 0.00053$ cm.

The quarter wave plate (circular polarizer) depicted in FIG. 3 can be thought of either as an optical element external to the laser or else as part of the output coupler. When it is external to the laser, then the preferred embodiment would have the two flat surfaces which transmit the laser beam be anti-reflection coated. This is not absolutely necessary for operation and therefore is not shown in FIG. 3.

Another alternative would be for the deformed zinc selenide to be the base material for the semi-transparent output coupler utilized in the laser. In this case, the front and back surface may have a long radius spherical curvature. This would not significantly affect the performance of the quarter wave plate. The surface facing the laser would, of course, be the semi-transparent reflector, while the outside surface would be anti-reflection coated in the preferred embodiment. The laser would require a polarizing element to assure the orientation of the linear polarization. Usually, this is accomplished by reflecting the laser beam off a mirror at a non-perpendicular angle. (These techniques are well known to those skilled in the art.) In this case, the output beam would emerge from the laser already circularly polarized, thereby eliminating the need for any external optics to provide this effect.

I claim:

1. A method of forming a phase retardation plate, the steps, comprising:

heat a piece of zinc selenide to a predetermined temperature in excess of 100° C.;

exert a force on said heated piece of zinc selenide such that said piece of zinc selenide will deform at said predetermined temperature and become birefringent;

cool said piece of zinc selenide thereby permanently holding some birefringence ($\Delta m$) after said force is released;

form said piece of birefringent zinc selenide into an optical element of predetermined thickness "t" such that when the steps are complete, the following equation is true: $(\Delta m)t > 0.00013$ cm.

2. In the method of claim 1, the step of heating said piece of zinc selenide includes the step of heating said piece of zinc selenide to a generally uniform temperature in excess of 200° C. and simultaneously preventing oxygen from contacting said piece of zinc selenide.

3. In the method of claim 1, the step of exerting a force on said piece of zinc selenide includes compressing said piece of zinc selenide between two surfaces.

4. In the method of claim 1, the step of exerting a force on said piece of zinc selenide includes rolling a cylinder over a surface of said piece of zinc selenide in such a way as to deform said piece of zinc selenide.

5. In the method of claim 1, the step of forming said piece of zinc selenide includes the step of choosing said thickness "t" such that the following equation is approximately true: $(\Delta m)t = 0.0026$ cm.

6. A method of forming a phase retardation plate comprising:

forming a piece of zinc selenide into an optical element of predetermined thickness "t" such that when the following steps are complete, the following equation is true: $(\Delta m)t > 0.00013$ cm;

heating said piece of zinc selenide to a predetermined temperature in excess of 100° C.;

exerting a force on said heated piece of zinc selenide such that said piece of zinc selenide will deform at said predetermined temperature and become birefringent; and cooling said piece of zinc selenide thereby permanently holding some birefringence ($\Delta m$) after said force is released.

7. In a method of claim 6, the step of heating said piece of zinc selenide includes the step of heating said piece of zinc selenide to a generally uniform temperature in excess of 200° C. and simultaneously preventing oxygen from contacting said piece of zinc selenide.

8. In the method of claim 6, the step of exerting a force on said piece of zinc selenide includes compressing said piece of zinc selenide between two surfaces.

9. In a method of claim 6, the step of exerting a force on said piece of zinc selenide includes rolling a cylinder over a surface of said piece of zinc selenide in such a way as to deform said piece of zinc selenide.

10. In the method of claim 6, the step of forming said piece of zinc selenide includes the step of choosing said thickness "t" such that the following is approximately true: $(\Delta m)t = 0.0026$.

* * * * *